United States Patent [19]

Gilbreath

[11] 3,719,858

[45] March 6, 1973

[54] OVERLOAD PROTECTION SYSTEM FOR A LIGHT DIMMER UNIT

[75] Inventor: Benjamin F. Gilbreath, Richardson, Tex.

[73] Assignee: Hunt Electronics Company, Dallas, Tex.

[22] Filed: Aug. 2, 1971

[21] Appl. No.: 168,005

[52] U.S. Cl..................317/16, 317/335 C, 317/38, 315/DIG. 4, 315/194, 315/200, 315/308, 307/293, 307/202, 323/22 SC
[51] Int. Cl..............................................H02h 3/08
[58] Field of Search....307/92, 94, 97, 100, 202, 297, 307/131; 315/DIG. 4, 194, 237, 238, 307, 308, 291, 279, 199, 200; 323/9; 317/33 SC, 16, 38; 221/14, 24

[56] References Cited

UNITED STATES PATENTS

| 3,243,653 | 3/1966 | Locklin | 315/194 |
| 3,414,766 | 12/1968 | Miller | 315/194 |
| 3,200,327 | 8/1965 | Fleming | 323/89 |
| 3,397,344 | 8/1968 | Skirpan | 315/194 |
| 3,374,420 | 3/1968 | Weber | 323/9 |
| 3,335,318 | 8/1967 | Yancey | 315/194 |

Primary Examiner—J. D. Miller
Assistant Examiner—Harvey Fendelman
Attorney—Giles C. Clegg, Jr. et al.

[57] ABSTRACT

In a light dimmer unit having a switching mechanism for controlling the alternating current flow to a lamp load and a controllable timing mechanism for controlling the fraction of each half cycle during which the switching mechanism is conductive, there is provided a current sensing mechanism for sensing the alternating current supplied to the lamp load. An average overload circuit is coupled to the output of the current sensing mechanism for clamping the timing of the dimmer timing mechanism at a predetermined value when the average value of the lamp load current exceeds a desired maximum value. A peak overload circuit is also coupled to the output of the current sensing mechanism for disabling the dimmer timing mechanism for discontinuing the flow of current to the lamp load when the peak value of the lamp load current exceeds a desired maximum.

8 Claims, 2 Drawing Figures

OVERLOAD PROTECTION SYSTEM FOR A LIGHT DIMMER UNIT

BACKGROUND OF THE INVENTION

This invention relates to lighting control systems and, more particularly, to overload protection systems for light dimmer units used in lighting control systems. While not limited thereto, overload protection systems in accordance with the present invention are particularly useful in connection with theater lighting systems, stage lighting systems and the like where each dimmer unit may be required to control a multiple-lamp lamp load.

In lighting control systems wherein each dimmer unit is required to control a lamp load comprised of a relatively large number of lamps connected in parallel, the current flow to the lamp load is ordinarily relatively large. This requires the use of relatively expensive high power semiconductor switching devices, such as silicon-controlled rectifiers, for purposes of varying the lamp load current for purposes of varying the brightness level of the lamps. It would be desirable, therefore, to protect such switching devices from damage caused by excessive current flow to the lamp load when, for example, one of the lamps suffers a short circuit condition. It has been heretofore proposed to provide such protection by using thermal-type fuses. Such fuses are, however, not always sufficiently fast acting to prevent damage to the semiconductor switching devices.

In one form of lighting control dimmer unit heretofore proposed, the dimmer unit is adjusted or controlled to vary the brightness of the lamp load by varying the fraction of each half cycle during which the semiconductor switching devices are allowed to pass current to the lamp load. If the number of lamps in a load is relatively large, it may be possible to set the dimmer unit control mechanism so that the magnitude of the lamp load current exceeds the limits of the thermal fuse. This blows the fuse and necessitates replacement of same. To prevent this need for changing fuses and, more importantly, the attendent interruption in the operation of the lighting system, it would be desirable to provide an automatic overload protection system which automatically limits the dimmer control action to prevent excessive current flow where the number of lamps and the dimmer control setting would otherwise tend to cause such excessive current flow.

It is an object of the invention, therefore, to provide a new and improved overload protection system for a light dimmer unit which can react in a very rapid manner in the event of an overload.

It is another object of the invention to provide a new and improved overload protection for a light dimmer unit which automatically limits the lamp load current to a safe value regardless of the number of lamps in the load and the control setting of the dimmer unit.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE FIG. 1 SYSTEM

Figure 1:
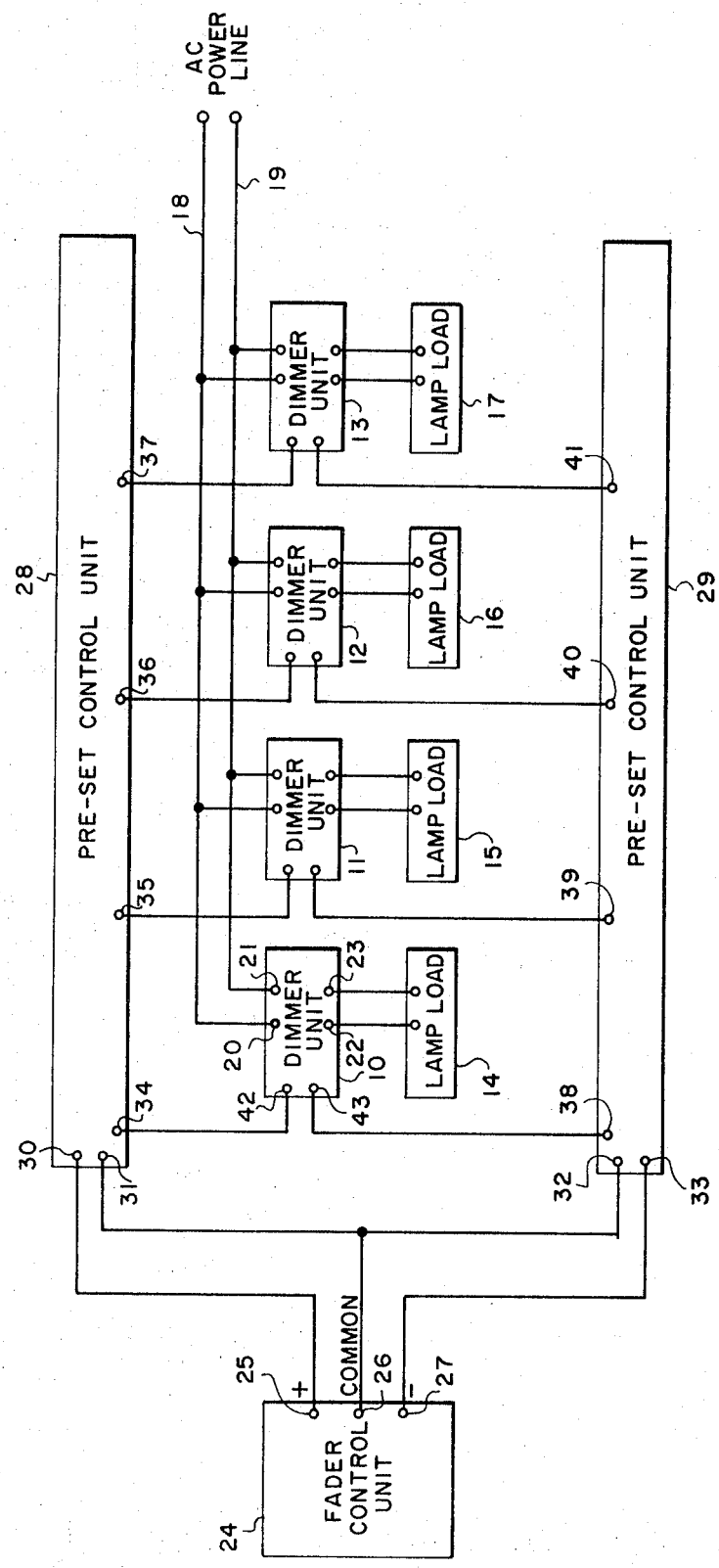
FIG. 1 is a block diagram of a lighting control system in which may be utilized an overload protection system constructed in accordance with the present invention.

Referring to FIG. 1, there is shown a stage lighting control system having a plurality of controllable dimmer units 10–13 connected between an alternating-current power source (not shown) and different ones of a plurality of lamp loads 14–17. Each of the dimmer units 10–13 includes a pair of alternating-current input terminals which are connected to a pair of alternating-current power supply conductors 18 and 19 which, in use, are connected to an alternating-current power line. The alternating-current input terminals for the dimmer unit 10 are indicated at 20 and 21. Each of the dimmer units 10–13 further includes a pair of alternating-current output terminals for connecting the dimmer unit to its lamp load. The alternating-current output terminals for dimmer unit 10 are indicated at 22 and 23. Each of the dimmer units 10–13 acts to control the fraction of each alternating-current half cycle during which current is allowed to flow from the alternating-current power supply conductors 18 and 19 to its lamp load. In this manner, by controlling the root-mean-square (r.m.s.) value of the current flow to the lamp load, the brightness or intensity of the lamp or lamps contained in the lamp load is controlled.

The lighting control system of FIG. 1 further includes a fader control unit 24 having a set of three output terminals 25, 26 and 27 for supplying separate but interdependent direct-current control voltages to the input terminals of a pair of pre-set control units 28 and 29, the input terminals for pre-set control unit 28 being indicated at 30 and 31 and the input terminals for pre-set control unit 29 being indicated at 32 and 33. For sake of explanation, fader unit output terminals 25, 26 and 27 will be referred to as positive, common and negative output terminals, respectively.

The first pre-set control unit 28 includes a plurality of output terminals 34–37, while the second pre-set control 29 includes a plurality of output terminals 38–41. Each of the dimmer units 10–13 includes a pair of direct-current control voltage input terminals, one of which is connected to one of the output terminals of the first pre-set control unit 28 and the other of which is connected to one of the output terminals of the second pre-set control unit 29. Dimmer unit 10, for example, includes a pair of direct-current control voltage input terminals 42 and 43, the former being connected to output terminal 34 of pre-set control unit 28 and the latter being connected to output terminal 38 of pre-set control unit 29. Each of the pre-set control units 28 and 29 includes a plurality of adjustable voltage dividers for individually determining the fractions of the pre-set unit direct-current input voltage which is allowed to appear at the different ones of the pre-set unit output terminals. As such, the voltage divider for the first unit output terminal 34 may be set to determine the upper brightness limit for the lamp load 14 controlled by the dimmer unit 10 and the voltage divider for the second unit output terminal 38 set to determine the lower or minimum brightness level for the lamp load 14 or vice versa.

Fader control unit 24 includes a direct-current power supply and an adjustable voltage divider for varying the magnitude of the direct-current control voltage appearing between output terminals 25 and 26 in an inverse manner with respect to the magnitude of the direct-current control voltage appearing between output terminals 27 and 26. In this manner, the voltage between terminals 27 and 26 is decreased as the voltage between terminals 25 and 26 is increased or vice versa. With the fader unit voltage divider set at one end of its range, one of the voltages assumes a maximum value and the other assumes a substantially zero value. When the fader unit voltage divider is set at the other end of its range, the situation is reversed. Thus, by adjusting the fader unit voltage divider, control of the various lamp loads 14–17 can be shifted from one of the pre-set control units 28 and 29 to the other of such pre-set control units 28 and 29. This enables the simultaneous adjustment of the various lamp loads 14–17 such that some may be turned up brighter and others may be turned down dimmer or turned off in accordance with the settings of the voltage dividers in the two pre-set control units 28 and 29.

In use, the fader control unit 24 and the pre-set control units 28 and 29 may be mounted on a common control panel in a control booth, while the various dimmer units 10–13 may be located backstage close to the lamp loads to be controlled. Both of the pre-set control units 28 and 29 are of an identical construction. All of the dimmer units 10–13 are also of the same construction. The number of dimmer units and lamp loads may be increased or decreased as desired, four such dimmer units and lamp loads being shown by way of example only.

DESCRIPTION OF THE FIG. 2 DIMMER UNIT

Figure 2:
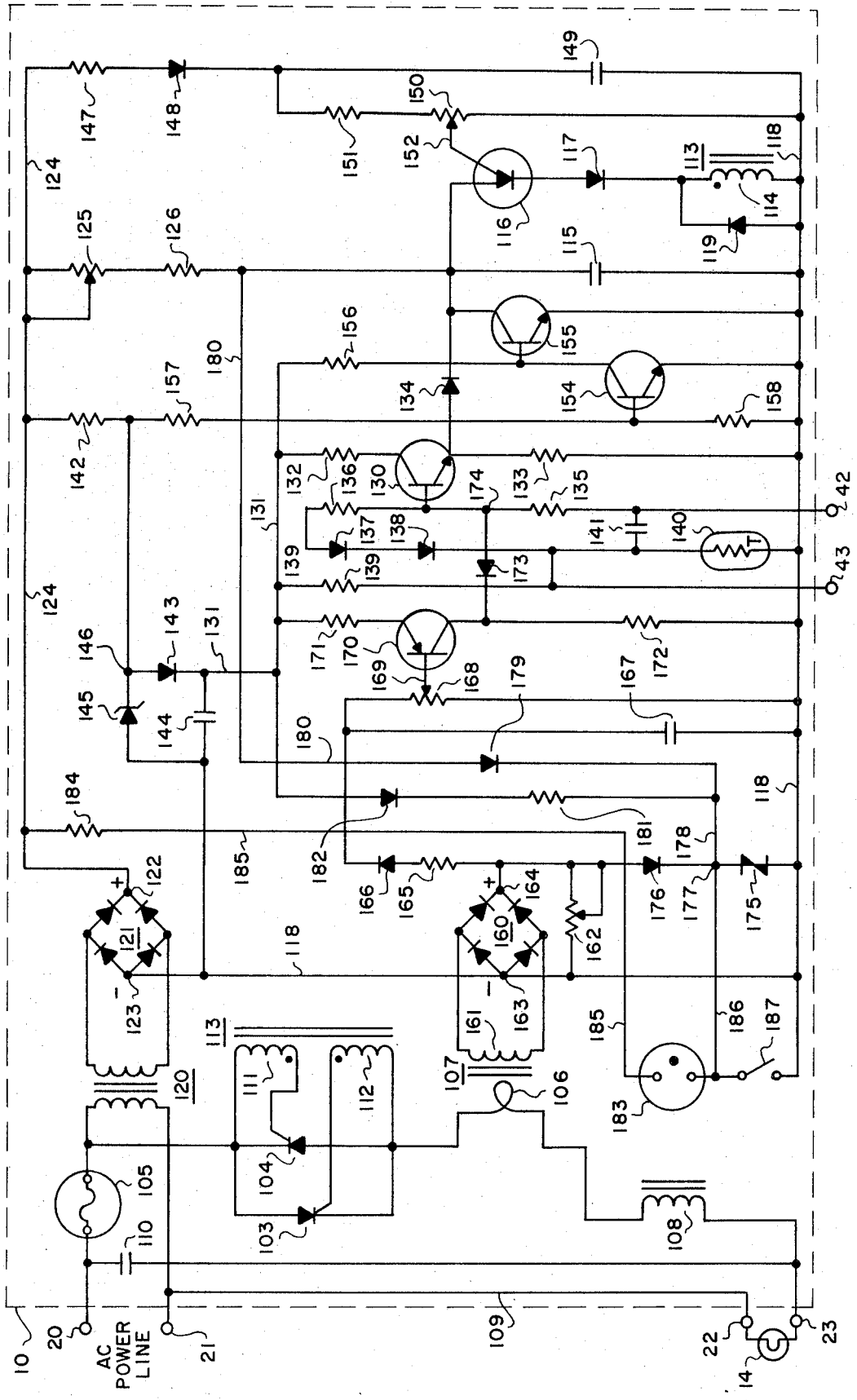
FIG. 2 is a detailed schematic circuit diagram of a dimmer unit used in the FIG. 1 system and employing an overload protection system constructed in accordance with the present invention.

Referring now to FIG. 2, there is shown the details of the dimmer unit 10 of FIG. 1. As seen in FIG. 2, the dimmer unit 10 includes circuit means for supplying an alternating-current voltage. This circuit means is represented by input terminals 20 and 21 which, in use, are connected to an alternating-current power line or other source of alternating-current power.

The dimmer unit 10 also includes switching circuit means adapted to be coupled in series between the alternating-current supply terminals 20 and 21 and the lamp load 14 for enabling current flow through the lamp load 14 when such switching circuit means is conductive. This switching circuit means includes a pair of oppositely-poled unilateral semi-conductor switching devices 103 and 104 of the silicon-controlled rectifier type. Silicon-controlled rectifiers 103 and 104 are connected by their anodes and cathodes in parallel with one another and one end of this parallel combination is connected to the alternating-current input terminal 20 by way of a fuse 105. The other end of this parallel combination is connected to the lamp load output terminal 23 by way of the low inpedance primary winding 106 of a current transformer 107 and a radio-frequency choke coil 108. The other lamp load output terminal 22 is connected directly to the second alternating-current input terminal 21 by means of a conductor 109. A radio-frequency by-pass capacitor 110 is connected between the first alternating-current input terminal 20 and the lamp load output terminal 23. Choke coil 108 and capacitor 110 constitute a radio-frequency filter for minimizing leakage to the alternating-current power line of transient-type radio-frequency components generated by the switching action of silicon-controlled rectifiers 103 and 104. The gate electrodes and cathodes of the silicon-controlled rectifiers 103 and 104 are connected to different ones of a pair of secondary windings 111 and 112 of a pulse transformer 113. The primary winding 114 for the pulse transformer 113 is shown near the lower right-hand corner of the drawing and, though shown in a separated manner, is actually wound on the same core structure as are the secondary windings 111 and 112. Silicon-controlled rectifiers 103 and 104 serve to control the fraction of each half cycle of the alternating-current line voltage during which current is allowed to flow from the alternating-current power line terminals 20 and 21 to the lamp load 14.

The dimmer unit 10 further includes a controllable timing mechanism for controlling the conduction intervals of the silicon-controlled rectifiers 103 and 104. This timing mechanism includes trigger circuit means for initiating conduction in the silicon-controlled rectifiers 103 and 104 and timing circuit means for triggering such trigger circuit means during each half cycle of the alternating-current voltage. Such timing circuit means is responsive to the direct-current control voltage supplied to dimmer unit direct-current control terminals 42 and 43 for controlling the trigger timing in accordance with the magnitude of such direct-current control voltage. The timing circuit means includes a timing capacitor 115 and the trigger circuit means includes a semiconductor switching device or trigger device represented by a programmable unijunction transistor 116, the latter being coupled across the timing capacitor 115 for discharging such timing capacitor 115 when the voltage thereacross exceeds a predetermined threshold level established by the programmable unijunction transistor 116. The trigger circuit means further includes circuit means represented by the pulse transformer 113 for sensing the flow of capacitor discharge current through the programmable unijunction transistor 116 and rendering the appropriate one of the silicon-controlled rectifiers 103 and 104 conductive at the onset of such capacitor discharge current. One end of the pulse transformer primary winding 114 is connected by way of a diode 117 to the cathode of the programmable unijunction transistor 116, while the other end of the pulse transformer primary winding 114 is connected to a common current return line 118 for the control portion of the dimmer unit 10. A further diode 119 is connected across the primary winding 114 for damping any reverse polarity spikes that might be produced by the primary winding 114.

The timing circuit means also includes rectifier circuit means for rectifying the alternating-current voltage appearing between alternating-current input terminals 20 and 21. This rectifier circuit means includes an isolation transformer 120 and a diode bridge type full-wave rectifier circuit 121. Output terminals 122 and 123 of rectifier circuit 121 are connected to a voltage supply line 124 and the common current return line 118, respectively, the voltage at terminal 122 being of positive polarity relative to the voltage at terminal 123. There thus appears on voltage supply line 124 a continuous succession of positive-going sinusoidal half cycles representing a full-wave rectified version of the alternating-current voltage appearing between dimmer unit alternating-current input terminals 20 and 21.

The timing circuit means further includes first charging circuit means responsive to the rectified alternating-current voltage appearing on the voltage supply line 124 for charging the timing capacitor 115 at a first rate. This first charging circuit means includes an adjustable resistor 125 and a fixed resistor 126 connected in series between the voltage supply line 124 and the upper end of the timing capacitor 115.

The dimmer unit 10 further includes circuit means for supplying thereto a direct-current control voltage and second charging circuit means responsive to such direct-current control voltage for charging the timing capacitor 115 at a second rate. The circuit means for supplying a direct-current control voltage includes the direct-current input terminals 42 and 43 which, as seen in FIG. 1, are connected to the pre-set control units 28 and 29 for receiving the direct-current voltages appearing at the output terminals 34 and 38 of such pre-set control units 28 and 29. The second charging circuit means includes an n-p-n type transistor 130 having its collector connected to a regulated voltage supply line 131 by way of a resistor 132 and having its emitter connected to the common current return line 118 by way of a resistor 133. The emitter of transistor 130 is also coupled to the upper end of the timing capacitor 115 by means of a diode 134. The direct-current control voltage input terminals 42 and 43 are connected to the base electrode of the transistor 130 by a voltage divider circuit formed by resistors 135 and 136 and diodes 137 and 138. A further resistor 139 is connected between the negative input terminal 43 and the regulated voltage supply line 131, while a thermistor 140 is connected between the negative terminal 43 and the common current return line 118. A radio-frequency by-pass capacitor 141 is connected between the two input terminals 42 and 43 for filtering out any undesired radio-frequency noise which may be supplied to the input terminals 42 and 43.

The dimmer unit 10 further includes a regulated direct-current power supply circuit for supplying regulated direct-current voltage to the regulated voltage supply line 131. This power supply circuit includes a resistor 142, a diode 143 and a filter capcitor or smoothing capacitor 144 which are connected in series between the output terminals 122 and 123 of the bridge rectifier circuit 121. This power supply circuit further includes a Zener diode 145 connected across the diode 143 and smoothing capacitor 144. Zener diode 145 provides the regulating action and, in effect, clamps the peak voltage at point 146 at a predetermined level of, for example, 25 volts. Capacitor 144 serves to smooth out the undulations in the rectified and peak limited voltage to provide on the voltage supply line 131 a constant amplitude regulated direct-current voltage.

The dimmer unit 10 further includes circuit means responsive to the alternating-current power line voltage for developing a direct-current bias voltage proportional to the peak amplitude thereof and for supplying same to the gate electrode of the trigger device represented by the programmable unijunction transistor 116 for controlling the threshold level of such trigger device 116. This threshold control circuit means includes a resistor 147, a diode 148 and a smoothing capacitor 149 connected in series between the rectified voltage supply line 124 and the common current return line 118. Diode 148 and capacitor 149 function as a peak detector to develop across the capacitor 149 a direct-current voltage proportional to the peak value of the rectified voltage on supply line 124 and, hence, proportional to the peak value of the alternating power line voltage appearing between pre-set unit input terminals 20 and 21. The threshold control circuit further includes a potentiometer 150 and a fixed resistor 151 connected in series across the smoothing capacitor 149. A sliding tape 152 on potentiometer 150 is connected to the gate electrode of the programmable unijunction transistor 116.

The dimmer unit 10 further includes additional switching circuit means coupled across the timing capacitor 115 and responsive to the rectified alternating-current voltage on voltage supply line 124 for completely discharging the timing capacitor 115 at the end of each half cycle of the alternating-current power line voltage. For sake of explanation, such additional switching circuit will be referred to as a "line sync" circuit. Such line sync circuit functions to insure that the discharging of the timing capacitor 115 is sychronized with the timing of the alternating-current power line voltage at terminals 20 and 21 so that the timing capacitor 115 will be completely discharged at the beginning of each half cycle of such alternating-current power line voltage. This line sync circuit includes a pair of cascade coupled n-p-n type transistors 154 and 155, the collector of the former being connected to the base electrode of the latter. Transistor 155 is connected across the timing capacitor 115 by means of its collector and emitter electrodes. The collector of the first transistor 154 is connected to the regulated voltage supply line 131 by way of a resistor 156 and the emitter of such transistor 154 is connected directly to the common current return line 118. The base electrode of the first transistor 154 is connected to a point intermediate a pair of voltage dividing resistors 157 and 158 which are connected in series between the power supply junction point 146 and the common current return line 118. The negative-going voltage spike appearing at this junction point 146 at the end of each alternating current half cycle serves to momentarily turn off the normally conductive first transistor 154 which, in turn, momentarily turns on the normally non-conductive second transistor 155.

The dimmer unit 10 further includes an overload protection system for preventing damage to the silicon-controlled rectifiers 103 and 104 and other components in the lamp load circuit in the event that excessive current should be drawn by the lamp load 14. As will be seen, this overload protection system includes means for protecting against both excessive values of average current flow as well as excessive values of peak current flow to the lamp load 14. This overload protection system includes circuit means for sensing the alternating current flowing to the lamp load 14 and developing a voltage signal proportional to the instantaneous amplitude thereof. This current sensing circuit means includes the current transformer 107 and a diode bridge type full-wave rectifier circuit 160. The low impedance primary winding 106 of the current transformer 107 is connected in series between the silicon-controlled rectifiers 103 and 104 and the lamp load 14, while the secondary winding 161 of the current transformer 107 is connected across a first diagonal of the bridge circuit 160. An adjustable load resistor 162 is connected between output terminals 163 and 164 of the bridge circuit 160. Terminal 163 is also connected to the common current return line 118. The polarity of the diodes in bridge circuit 160 are such that the voltage fluctuations appearing at output terminal 164 are all of positive polarity, such fluctuations corresponding in waveform to a full-wave rectified version of the current fluctuations passing through the primary winding 106 of the current transformer 107.

The overload protection system further includes circuit means coupled to the current sensing circuit means represented by transformer 107 and bridge circuit 160 for clamping the dimmer unit 10 at a predetermined operating level when the average value of the current flowing to lamp load 14 exceeds a predetermined value. This average overload circuit means includes a resistor 165, a diode 166 and a filter capacitor 167 connected in series between bridge circuit output terminal 164 and the common current return line 118. Diode 166 and capacitor 167 function as a detector circuit to develop across the capacitor 167 a direct-current voltage proportional to the average value of the alternating current flowing to the lamp load 14. By "average" value is meant the average value over a half cycle, as opposed to a full cycle, or, more accurately, the average value over several cycles with the assumption that all half cycles are of the same polarity. The average overload circuit further includes a voltages dividing potentiometer 168 having a sliding contact 169 connected to the base electrode of a p-n-p type transistor 170. The emitter of transistor 170 is connected to the regulated voltage supply line 131 by way of a resistor 171, while the collector of transistor 170 is connected to the current return line 118 by way of a resistor 172. The collector of transistor 170 is further connected to the base electrode of the charging circuit transistor 130 by way of a diode 173. As will be seen, the average overload circuit serves to clamp the voltage level at junction point 174 at a fixed predetermined value whenever the average value of the lamp load current exceeds a desired maximum level.

The overload protection system further includes circuit means coupled to the current sensing circuit means represented by transformer 107 and rectifier 160 for disabling the dimmer unit 10 when the peak value of the current flowing to the lamp load 14 exceeds a predetermined value. This peak overload circuit includes a semiconductor breakover device in the form of a silicon symmetrical switch 175 which is coupled to the rectifier output terminal 164 by way of a diode 176. The other end of the silicon symmetrical switch 175 is connected to the common current return line 118. The silicon symmetrical switch 175 is a bilateral diode switch device which has a fairly high internal impedance until the voltage thereacross exceeds a breakover level, following which the internal impedance of the device 175 becomes relatively small. Thus, when one of the unidirectional pulses at the rectifier output terminal 164 exceeds the breakover level of the device 175, such device becomes conductive and effectively shorts the junction point 177 to the current return line 118. This junction point 177 is connected to the timing capacitor 115 by way of conductor wire 178, diode 179 and conductor wire 180. Thus, when conductive, the device 175, in effect, shorts out the timing capacitor 115. This disables dimmer unit 10 and prevents further current flow to the lamp load 14. Holding current for maintaining the device 175 conductive once the breakover level has been exceeded is provided by way of conductor wire 178, resistor 181 and diode 182, the latter being connected to the regulated voltage supply line 131.

When the silicon symmetrical switch 175 is conductive, a warning lamp 183 is turned on. Current for energizing the warning lamp 183 flows from the rectified voltage supply line 124 by way of a resistor 184, conductor wire 185, the lamp 183, conductor wire 186 and the silicon symmetrical switch 175 to the common current return line 118. The peak overload circuit may be reset by momentarily depressing a spring-loaded pushbutton switch 187 for purposes of momentarily closing same. This shorts out the silicon symmetrical switch 175 and turns same off.

OPERATION OF THE FIG. 2 DIMMER UNIT

Considering now the operation of the dimmer unit 10, the power switching mechanism represented by silicon-controlled rectifiers 103 and 104 serves to control the fraction of each half cycle during which current is allowed to flow from the alternating-current power line terminals 20 and 21 to the lamp load 14, silicon-controlled rectifier 103 allowing current flow in one direction and silicon-controlled rectifier 104 allowing current flow in the opposite direction. Silicon-controlled rectifiers 103 and 104 are triggered by pulses produced by the programmable unijunction transistor 116 and supplied to the gate electrodes of such silicon-controlled rectifiers 103 and 104 by the pulse transformer 113. Each pulse triggers the silicon-controlled rectifier which at that moment has a positive voltage on its anode and a negative voltage on its cathode, such silicon-controlled rectifier thereafter being turned off when the alternating-current voltage reverses polarity.

The programmable unijunction transistor 116 is normally non-conductive. It becomes conductive and generates a current flow pulse when its anode voltage exceeds its gate electrode voltage. Thus, the setting of sliding contact 152 on the peak detector circuit potentiometer 150 establishes the voltage threshold level at which the timing capacitor 115 will be discharged by the programmable unijunction transistor 116.

At the beginning of each half cycle of the alternating-current power line voltage at terminals 20 and 21, the timing capacitor 115 is completely discharged. If this was not accomplished by the programmable unijunction transistor 116, it will have been accomplished by the line sync circuit provided by transistors 154 and 155. Transistor 154 is normally conductive and transistor 155 is normally non-conductive. At the end of each half cycle of the power line voltage, there appears at the power supply junction point 146 a negative-going voltage spike produced when the pulsating voltage on the voltage supply line 124 falls below the breakover level of the Zener diode 145. This negative-going voltage spike is supplied by way of resistor 157 and momentarily turns off the first line sync transistor 154. This momentarily turns on the second transistor 155 and the resulting collector-to-emitter current flow therethrough discharges the timing capacitor 115.

During the first portion of each half cycle, the timing capacitor 115 is charged by two different charging circuit mechanisms one of which is responsive to the direct-current control voltage mechanisms, across the dimmer unit input terminals 42 and 43 and the other of which is responsive to the pulsating full-wave rectified voltage appearing on voltage supply line 124. For convenience, the control voltage responsive mechanism will be referred to as the "fast" charge mechanism and the rectified voltage responsive mechanism will be referred to as the "slow" charge mechanism.

Considering first the fast charge mechanism, the timing capacitor 115 is charged at a relatively rapid rate by the flow of direct current from the regulated voltage supply line 131, through resistor 132, through the collector-to-emitter portion of transistor 130 and through diode 134 to capacitor 115. The actual charge rate is determined by the internal impedance of the transistor 130 which is, in turn, determined by the magnitude of the direct-current control voltage applied across dimmer unit input terminals 42 and 43. These input terminals 42 and 43 are connected to the base electrode of transistor 130 by the voltage divider formed by resistors 135 and 136. The greater the magnitude of the direct-current control voltage, the lower the internal impedance of the transistor 130 and the faster the rate of charging of the timing capacitor 115. As will be seen, the bias on the gate electrode of the programmable unijunction transistor 116 is such that the charging of the timing capacitor 115 by the fast charge transistor 130 alone will not be sufficient to trigger the programmable unijunction transistor 116.

To the fast charge voltage being built up across the timing capacitor 115, there is added a slow charge voltage supplied thereto by the slow charge mechanism which is represented by resistor 125 and 126. Each of the positive-going half cycles of the pulsating voltage on supply line 124 causes an approximately square law charging of the timing capacitor 115. For simplicity of understanding, this sine wave charging can be thought of as taking over and continuing the charging of the timing capacitor 115 following completion of the initial fast charge applied by way of fast charge transistor 130. This additional slow charge component continues until the voltage across timing capacitor 115 exceeds the threshold level of the programmable unijunction transistor 116. At this point, the programmable unijunction transistor 116 becomes conductive and the timing capacitor 115 is very quickly discharged by way of such transistor 116 and the primary winding 114 of pulse transformer 113. The pulse produced by this sudden flow of capacitor discharge current through the primary winding 114 triggers the appropriate one of the silicon-controlled rectifiers 103 and 104.

The larger the magnitude of the direct-current control voltage at terminals 42 and 43, the quicker is the timing capacitor 115 charged up to the threshold level and the sooner in each half cycle is fired the appropriate one of silicon-controlled rectifiers 103 and 104. Thus, the greater is the fraction of each half cycle during which current flows through the lamp load 14 and, hence, the greater is the brightness of the lamps in lamp load 14.

In order to provide a preliminary setup adjustment for the dimmer unit 10, the maximum value of direct-current control voltage is applied between the input terminals 42 and 43. The sliding contact 152 on the potentiometer 150 is then adjusted to adjust the bias on the gate electrode of the programmable unijunction transistor 116 to give the maximum desired brightness level (usually "full on") for the lamp load 14. Next, the voltage difference between input terminals 42 and 43 is set to zero and the adjustable resistor 125 in the slow charge circuit is adjusted so that the programmable unijunction transistor 116 just barely does not fire during each half cycle. In other words, resistor 125 is adjusted so that the timing capacitor 115 will be charged up by the sine wave charging to just slightly less than the threshold level of unijunction transistor 116 during the course of a complete half cycle. Lack of triggering of the programmable unijunction transistor 116 keeps current from flowing to the lamp load 14 and, hence, causes the lamp load 14 to be turned off.

Variations in the peak amplitude of the alternating power line voltage at dimmer unit input terminals 20 and 21 will cause corresponding variations in the peak amplitude of the pulsating rectified voltage on voltage supply line 124. This, in turn, will cause undesired variations in the time required for the slow charge circuit to charge the timing capacitor 115 up to the unijunction transistor threshold level. Such an undesired change in the trigger timing is offset and compensated for by an automatic and corresponding change in the magnitude of the bias voltage supplied to the gate electrode of the unijunction transistor 116. Thus, if the alternating-current line voltage amplitude increases, which increase would cause an earlier firing of the unijunction transistor 116, the bias voltage on the gate electrode of unijunction transistor 116 is increased a proportionate amount, which increase would cause a later firing of the unijunction transistor 116. These two factors offset one another so that the unijunction transistor 116 is fired at the desired time.

Diodes 137 and 138 in the direct-current control voltage input circuit of the fast charge transistor 130 serve to provide a further increase in the charge rate for very low values of direct-current control voltage. In other words, until the internal threshold or breakover level of the diodes 137 and 138 is exceeded, such diodes remain essentially non-conductive and the full value of the direct-current control voltage is applied to the base electrode of the fast charge transistor 130. When such internal thresholds are exceeded and the diodes 137 and 138 become conductive, the voltage divider formed by resistors 135 and 136 provide a voltage dividing action such that the control voltage applied to the base electrode of transistor 130 corresponds to approximately one-half of the control voltage value appearing between input terminals 42 and 43. Thus, for very low values of direct-current control voltage, an even faster charge rate is employed by the fast charge circuit. This makes the control voltage amplitude versus lamp load brightness curve more nearly square law in nature.

Thermistor 140 provides temperature compensation to compensate for changes with temperature in the operating characteristics of the fast charge transistor 130, the diode 134 and the programmable unijunction transistor 116.

Considering now the overload protection portion of the dimmer unit 10, the current transformer 107 senses the current flow to the lamp load 14 and produces across the secondary winding 161 voltage pulses proportional in amplitude to the amplitude of the lamp load current pulses. These voltage pulses are full-wave rectified by the bridge rectifier circuit 160 so that all of the pulses appearing at the output terminal 164 thereof are of positive polarity.

The average overload portion of the overload protection system senses the average value of the positive polarity pulses at rectifier output terminal 164 and clamps the base electrode of the fast charge transistor 130 at a predetermined and relatively small voltage level when such average value exceeds a desired maximum value. More particularly, filter capacitor 167 receives the positive polarity pulses appearing at rectifier output terminal 164 and integrates or averages same to produce across such capacitor 167 a voltage proportional to the average value thereof and, hence, to the average value of the lamp load current. When the lamp load current is below the overload level, the voltage developed across filter capacitor 167 is not sufficient to turn off the normally conductive transistor 170. With the transistor 170 conductive, there is developed across the resistor 172 a voltage which keeps the clamping diode 173 turned off.

When the lamp load current exceeds the overload level, on the other hand, the resulting average voltage developed across the filter capacitor 167 turns off the transistor 170. This decreases the voltage drop across collector resistor 172 and turns on the clamping diode 173. This enables such diode 173 to clamp the base electrode of the fast charge transistor 130 to reduce the fast charge to a maximum safe value and to prevent such safe value from being exceeded by either the existing or subsequent values of the direct-current control voltage applied to the input terminals 42 and 43. The threshold level for this average overload circuit is set at the desired value by proper adjustment of the sliding contact 169 of the potentiometer 168.

Considering now the peak overload portion of the overload protection system, the silicon symmetrical switch 175 serves to monitor the peak value of the positive pulses appearing at rectifier output terminal 164. The breakover level of silicon symmetrical switch 175 is equal to the peak voltage value at the rectifier output terminal 164 corresponding to the maximum peak value of current flow which is desired through the lamp load 14. When the peak amplitude of one or more of the pulses at rectifier output terminal 164 exceed this breakover level, the silicon symmetrical switch 175 becomes conductive and provides a very low impedance connection between the junction point 177 and the common current return line 118. Since the silicon symmetrical switch 175 is connected in parallel with the timing capacitor 115 by means of conductor 178, diode 179 and conductor 180, this effectively shorts out the timing capacitor 115 and prevents any further charging thereof. This prevents further triggering of the silicon-controlled rectifiers 103 and 104 and, hence, prevents further current flow to the lamp load 14. Holding current for keeping the silicon symmetrical switch 175 conductive is supplied thereto from the regulated power supply 142–145 by way of diode 182, resistor 181 and conductor 178.

When the silicon symmetrical switch 175 is conductive, the peak overload warning lamp 183 is lit by current flow by way of resistor 184, conductor 185, lamp 183, conductor 186 and silicon symmetrical switch 175. The peak overload circuit may be reset by momentarily depressing or closing the spring-loaded pushbutton switch 187. This shorts out the silicon symmetrical switch 175 and turns same off. Diodes 176 and 182 prevent any reverse current flow therepast by way of the warning lamp 183 when the silicon symmetrical switch is not conductive.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. An overload protection system for a light dimmer unit comprising:
    circuit means for sensing the alternating current supplied by a dimmer unit to a lamp load;
    circuit means coupled to the current sensing circuit means for clamping the dimmer unit at a predetermined operating level when the average value of the lamp load current exceeds a predetermined value;
    and circuit means coupled to the current sensing circuit means for disabling the dimmer unit when the peak value of the lamp load current exceeds a predetermined value.

2. An overload protection system in accordance with claim 1 wherein the light dimmer unit includes a switching mechanism for controlling the alternating current flow to the lamp load and a controllable timing mechanism for controlling the fraction of each half cycle during which the switching mechanism is conductive, wherein the circuit means for clamping the dimmer unit comprises circuit means for clamping the timing of the dimmer unit timing mechanism when the average value of the lamp load current exceeds a predetermined value and wherein the circuit means for disabling the dimmer unit comprises circuit means for disabling the dimmer unit timing mechanism for discontinuing the flow of current to the lamp load when the peak value of the lamp load current exceeds a predetermined value.

3. An overload protection system in accordance with claim 2 wherein the dimmer unit timing mechanism includes a timing capacitor, a trigger device coupled to the timing capacitor for discharging same and supplying a trigger pulse to the dimmer unit switching mechanism when the charge on the timing capacitor exceeds a predetermined threshold level and controllable charging circuit means for charging the timing capacitor at a controllable rate, wherein the circuit means for clamping the dimmer unit timing mechanism comprises average overload circuit means coupled to the controllable charging circuit means for clamping the timing capacitor charging rate at a predetermined value when the average value of the lamp load current exceeds a predetermined value and wherein the circuit means for disabling the dimmer unit timing mechanism comprises peak overload circuit means for discharging the timing capacitor below the trigger device threshold level and for maintaining same in such discharged condition when the peak value of the lamp load current exceeds a predetermined value.

4. An overload protection system in accordance with claim 3 wherein the peak overload circuit means comprises a semiconductor breakover device coupled across the timing capacitor.

5. An overload protection system in accordance with claim 3 wherein the circuit means for sensing the alternating current supplied to the lamp load includes current transformer means coupled to the lamp load circuit for developing an alternating current output voltage proportional to the lamp load current and rectifier circuit means for rectifying the current transformer output voltage and wherein both the average overload circuit means and the peak overload circuit means are both coupled to the output of this rectifier circuit means.

6. An overload protection system in accordance with claim 5 wherein the average overload circuit means includes filter circuit means coupled to the output of the rectifier circuit means for developing a signal proportional to the average value of the rectifier output voltage and circuit means coupled to the charging circuit means and responsive to the filter circuit means output signal for clamping the timing capacitor charging rate at a predetermined value when the average value of the lamp load current exceeds a predetermined value.

7. An overload protection system in accordance with claim 6 wherein the peak overload circuit means comprises a semiconductor breakover device coupled to the output of the rectifier circuit means and coupled in parallel with the timing capacitor.

8. An overload protection system for a light dimmer unit having a switching mechanism for controlling the alternating current flow to a lamp load, a timing capacitor, a trigger device coupled to the timing capacitor for discharging same and supplying a trigger pulse to the switching mechanism when the charge on the timing capacitor exceeds a predetermined threshold level and controllable charging circuit means for charging the timing capacitor at a controllable rate, such overload protection system comprising:

circuit means for sensing the alternating current supplied by the dimmer unit to the lamp load;

and circuit means coupled to the current sensing circuit means for clamping the charging circuit means at a predetermined charging rate when the average value of the lamp load current exceeds a predetermined value.

* * * * *